(12) United States Patent
Sherman et al.

(10) Patent No.: US 7,076,065 B2
(45) Date of Patent: Jul. 11, 2006

(54) CHAOTIC PRIVACY SYSTEM AND METHOD

(75) Inventors: Richard H. Sherman, Fremont, CA (US); Chamroenu Kchao, San Jose, CA (US); Billy Pettijohn, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 841 days.

(21) Appl. No.: 09/853,288

(22) Filed: May 11, 2001

(65) Prior Publication Data

US 2002/0176574 A1   Nov. 28, 2002

(51) Int. Cl.
*H04L 9/16* (2006.01)
(52) U.S. Cl. ....................................... 380/263
(58) Field of Classification Search ................ 380/263, 380/46
See application file for complete search history.

(56) References Cited

U.S. PATENT DOCUMENTS

| | | | | |
|---|---|---|---|---|
| 4,810,975 A | * | 3/1989 | Dias .............................. | 331/78 |
| 5,007,087 A | * | 4/1991 | Bernstein et al. .............. | 380/46 |
| 5,379,346 A | * | 1/1995 | Pecora et al. ................ | 380/263 |

* cited by examiner

*Primary Examiner*—Matthew Smithers
(74) *Attorney, Agent, or Firm*—Kenneth W. Float

(57) ABSTRACT

Systems and methods for protecting privacy in transmitting an analog information signal. The present invention combines the information signal with an analog random signal generated by a chaotic circuit and transmits the signal. The received signal is synchronized using a receiving chaotic circuit. The received signal is demodulated using a synchronized replica of the analog random signal. The information signal is recovered since the product of the random signals generated in the transmitter and in the receiver, is unity. Techniques used in the present invention for generating chaos, synchronization, and signal recovery are also disclosed.

8 Claims, 5 Drawing Sheets

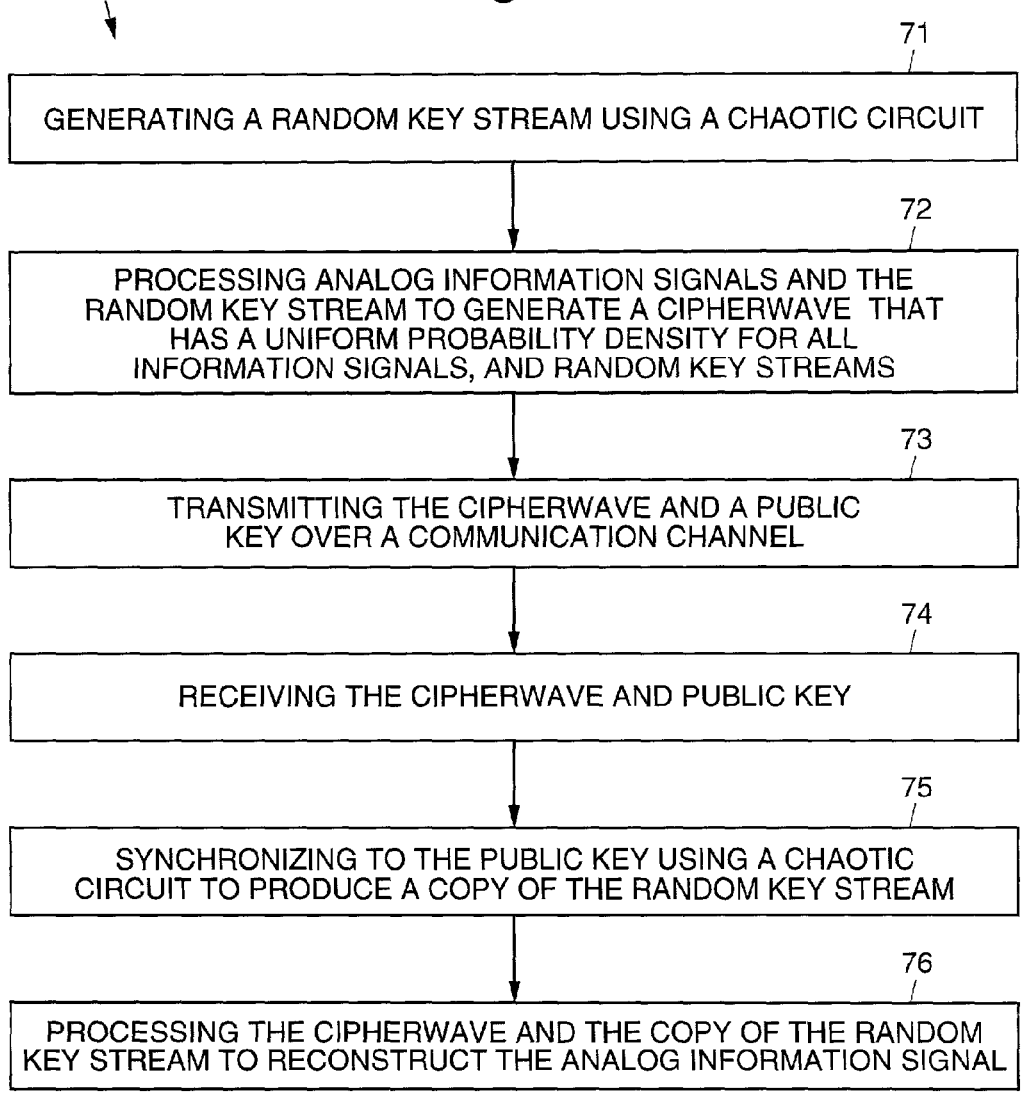

CHAOTIC PRIVACY SYSTEM AND METHOD

BACKGROUND

The present invention relates generally to privacy systems and methods, and more particularly, to improved chaotic privacy systems and methods.

Traditionally privacy for analog signals is established by digitizing the signals, then encrypting bits of the signal with a secure algorithm, which then generates a digital signal for transmission, or the digital signal is reconverted back to an analog signal. The sampling process is error prone with sampling error, quantizing error and losses due to a band-limited channel. If the original analog signal is desired, then the received digital signal could be passed through a digital-to-analog converter to recover the analog signal.

Examples of this process include secure speech and secure video. For analog signals of high bandwidth, the sampling process is even more error prone due to technology limitations of analog-to-digital converters. For example, a 4 GHz bandwidth with a 10 giga-sample per second sample rate, each sample with 8 bits per sample, requires a transmission bit rate of 80 giga-bits per second. Neither the analog-to-digital conversion nor the free space transmission bandwidth are possible with currently-available technology.

Analog privacy involves information secrecy where the information is concealed by a cipher or a code. The existence of a message is not hidden, only its information content. An unintended receiver is assumed to have the required equipment necessary to intercept and record the transmitted signal. The interceptor may even know the structure of the transmitter and receiver.

In Shannon Secrecy, the probability density of transmitted signal is independent from the information signal probability density. One way to achieve this independence is to cause the transmitted signal to have nearly an nth order uniform density distribution. The inverse function, which recovers the information, would require a key parameter without which no information can be recovered.

The other traditional approach for protecting analog signals is spread spectrum and/or frequency hopping techniques. The spread spectrum techniques use a pseudorandom noise generator with a reproducible number sequence in the receiver. These techniques have a pseudo random repetition period, which can be used to break the disguised signal.

It is therefore an objective of the present invention to provide for chaotic privacy systems and methods that protect analog signals and improve upon the above-discussed techniques.

SUMMARY OF THE INVENTION

To accomplish the above and other objectives, the present invention provides for chaotic privacy systems and methods that protect analog signals transmitted from a transmitter to a receiver. The approach used in the chaotic privacy systems and methods is to use a chaotic circuit as a random signal generator for a key stream. Unlike spread spectrum techniques, there is no pseudorandom repetition period. In the transmitter, a function, $f(.,.)$, of two variables is used to operate on information signals $i(t)$ and a key stream, $k(t)$. The function is designed to preserve a cipherwave, $c(t)$, as a uniform probability density for all information signals $i(t)$ and key streams $k(t)$.

In the receiver, chaotic circuit synchronization reproduces a copy of the random signal. This synchronization occurs for each element of $f(.,k)$. The cipherwave preserves the nth order uniform distribution of the cipherwave $c(t)$. A key generator is defined by $i_k(.)$. A key parameter, $z(0)$, is used to define the key generator dynamics. Unless the receiver possess the key parameter, it will not synchronize, The present invention protects analog signals such that an unintended receiver cannot recover the analog information or recognize the pattern of the analog information contained in the transmitted signal. The present invention transmits a secure random signal that is synchronized with an intended receiver using synchronized chaos. In the present invention, protection comes through the use of a Shannon Secrecy argument applied to the analog information signals that are transmitted. The chaotic circuits used in the present invention are synchronized for data recovery without sampling the transmitted information signal.

One advantage of the present chaotic privacy systems and methods is that there are no periodic components. The chaotic privacy systems and methods do not require sampling or channelizing the bandlimited analog information signal.

BRIEF DESCRIPTION OF THE DRAWINGS

The various features and advantages of the present invention may be more readily understood with reference to the following detailed description taken in conjunction with the accompanying drawings, wherein like reference numerals designate like structural element, and in which:

FIG. 7 is a flow diagram illustrating an exemplary chaos privacy method in accordance with the principles of the present invention.

DETAILED DESCRIPTION

Figure 1:
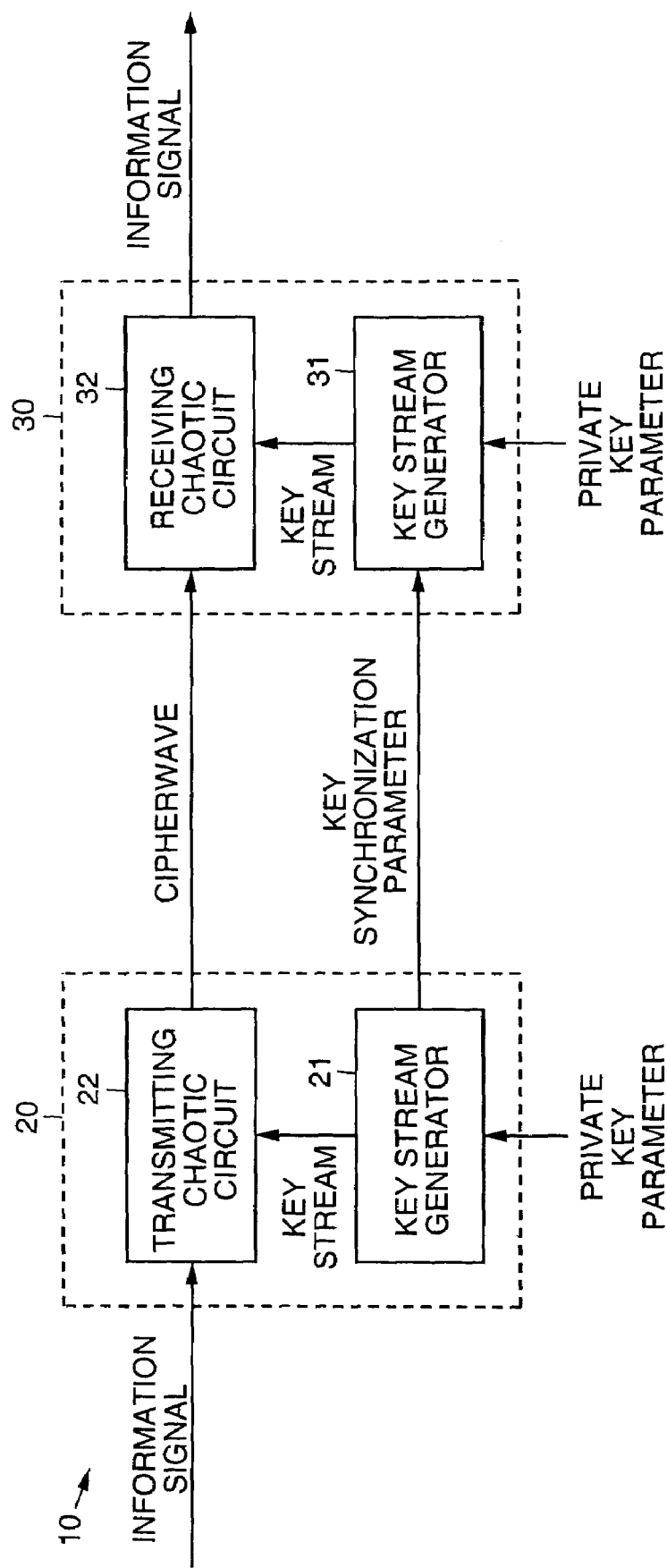
FIG. 1 illustrates the architecture of an exemplary chaos privacy system in accordance with the principles of the present invention.

Referring to the drawing figures, FIG. 1 illustrates the architecture of an exemplary chaos privacy system 10 in accordance with the principles of the present invention. The exemplary chaos privacy system 10 comprises a transmitter 20 and a receiver 30. Information signals are communicated by way of a communication channel from the transmitter 20 to the receiver 30.

The transmitter 20 comprises a key stream generator 21 and a transmitting chaotic circuit 22. The key stream generator 21 generates a key stream $k(t)$ in response to a private key parameter $z(0)$, The key stream generator 21 also outputs a key synchronization parameter (or public key) $u^*(t)$ which is transmitted to the receiver 30 by way of the communication channel. The transmitting chaotic circuit 22 processes a band limited analog information signal $i(t)$ and the key stream k(t) output by the key stream generator 21, and outputs a cipherwave c(t) which is a function f(.,.) of the analog information signal i(t) and the key stream. The cipherwave c(t) is transmitted to the receiver 30 by way of the communication channel.

The receiver 30 comprises a key stream generator 31 and a receiving chaotic circuit 32. The receiving chaotic circuit 32 processes a copy of the private key parameter z*(0) and the key synchronization parameter (or public key) u*(t) transmitted from the key stream generator 21 in the transmitter 20. The receiving chaotic circuit 32 generates a copy of the key stream k*(t). The receiving chaotic circuit 32 processes the copy of the key stream k*(t) and the cipherwave c(t), and demodulates the cipherwave c(t) to recover and output the analog information signal, i*(t).

The system 10 thus provides privacy in transmitting the analog information signal. The system 10 combines the information signal with the analog random signal generated by the transmitting chaotic circuit 22 that is synchronized with the receiving chaotic circuit 32. The received signal is demodulated using a synchronized replica of the analog random signal. The information signal is recovered since the product of the random signals, one generated in the transmitter 20 and one generated in the receiver 30, is unity.

The security of the random number generator (key stream generator 21), and particularly repeatable generators, is of importance in security. The security of a random number generator means, how difficult it is, based on past values of a sequence, to predict future values of the sequence. One measure of the difficulty is in information theory terms. The lower the mutual information between the present state and a previous state, the more difficult it is to recover the previous state.

The average rate of information loss in a chaotic system is equal to the Lyapunov exponent. The Lyapunov exponent may be calculated from the invariant probability distribution:

$$\lambda = \int_0^{2\pi} \log\left|\frac{df}{d\phi}\right| \cdot p(\phi)\,d\phi.$$

Figure 2:
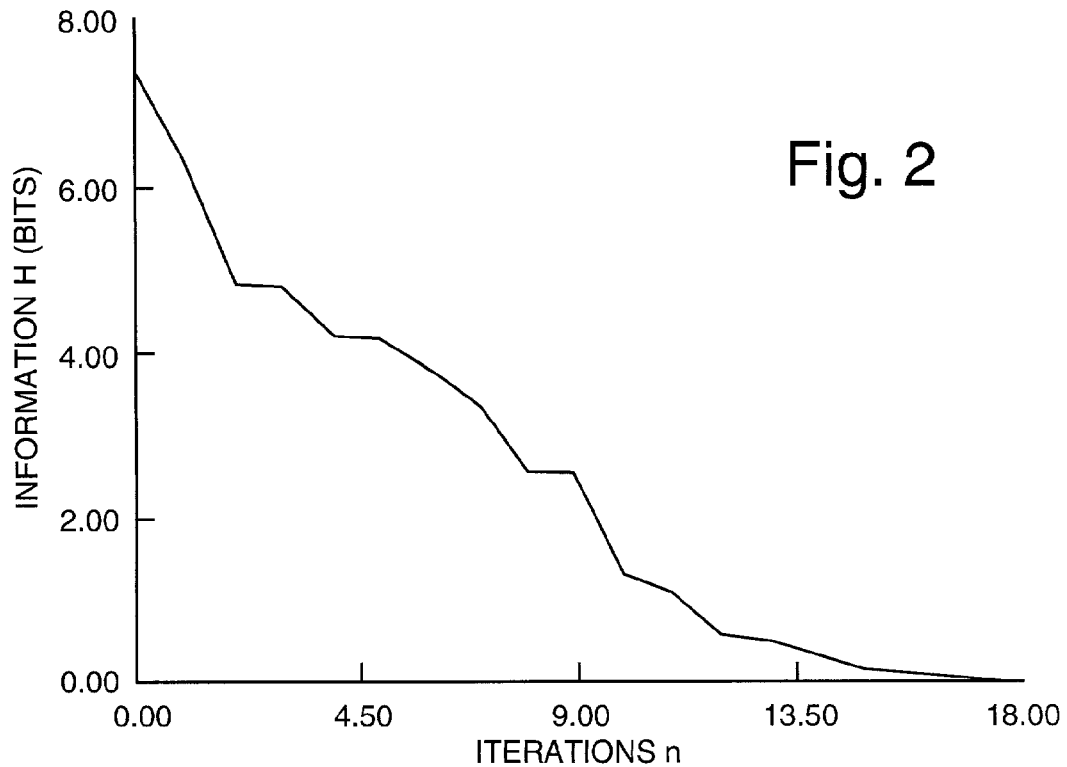
FIG. 2 illustrates mutual information loss as a function of iteration for the random number generator used in the present invention.

The above probability distribution gives the information loss for the nonlinear circuit (key stream generator 21) used to generate random numbers in the system 10. FIG. 2 is a plot that illustrates mutual information loss as a function of iteration for the random number generator (key stream generator 21). Each iteration is a separate frequency generated by the system 10 using the plot illustrated in FIG. 2.

Chaotic Circuits.

Figure 3:
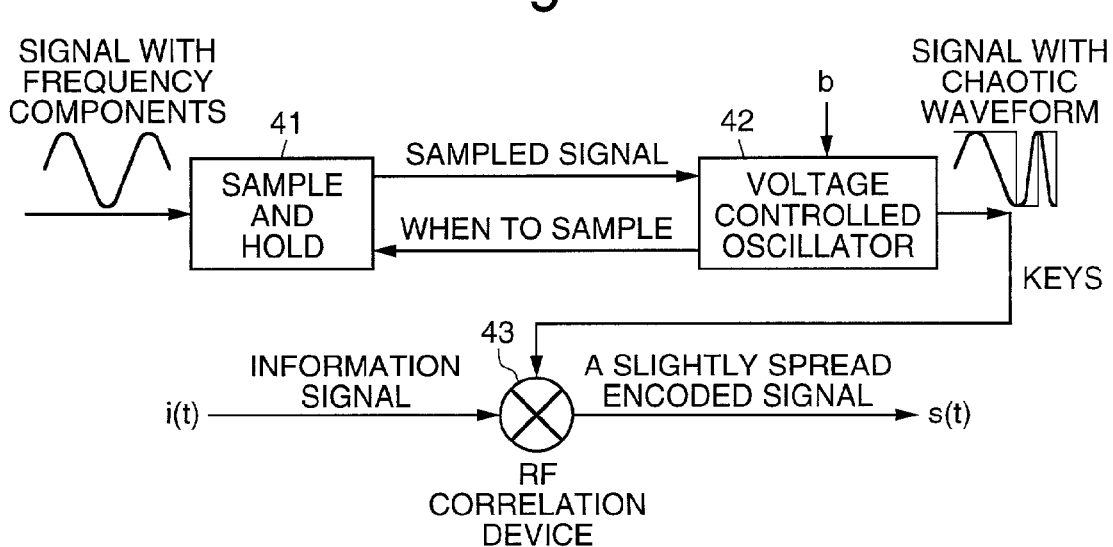
FIG. 3 illustrates that the architecture of the key generator used in the present invention is a chaotic circuit.

Details of exemplary random number generators (key stream generators 21, 31) employed in the system 10 are illustrated in FIG. 3. The random number generators may be represented mathematically as a Sine circle map, given by the equations $fn=tn$ mod 1, and $fn+1=fn+1/(fo(1+b \sin (2p\ tn))$.

There are two parameters, that characterize the dynamics of the random number generators: fo, which is the initial phase angle, and b, which is the loop gain.

FIG. 3 illustrates that the architecture of the key stream generators 21, 31 used in the system 10 are chaotic circuits. A signal having frequency components (generated by a separate voltage controlled oscillator) is sampled by a sample and hold circuit (S&H) 41. The analog sample values are used as control voltages for a voltage controlled oscillator (VCO) 42. The frequencies of the signals output by the VCO 42 are centered around zero. The output signals from the VCO 42 (random keys or key stream) are input to an RF correlation device 43 that correlates them with the information signal i(t). When an output wave crosses the zero axis, a signal is sent to the sample and hold circuit 41 to acquire the next sample. The process repeats, but each time a different sample value is acquired, and a different frequency results. The output of the RF correlation device 43 is a slightly spread encoded signal s(t).

Figure 4:
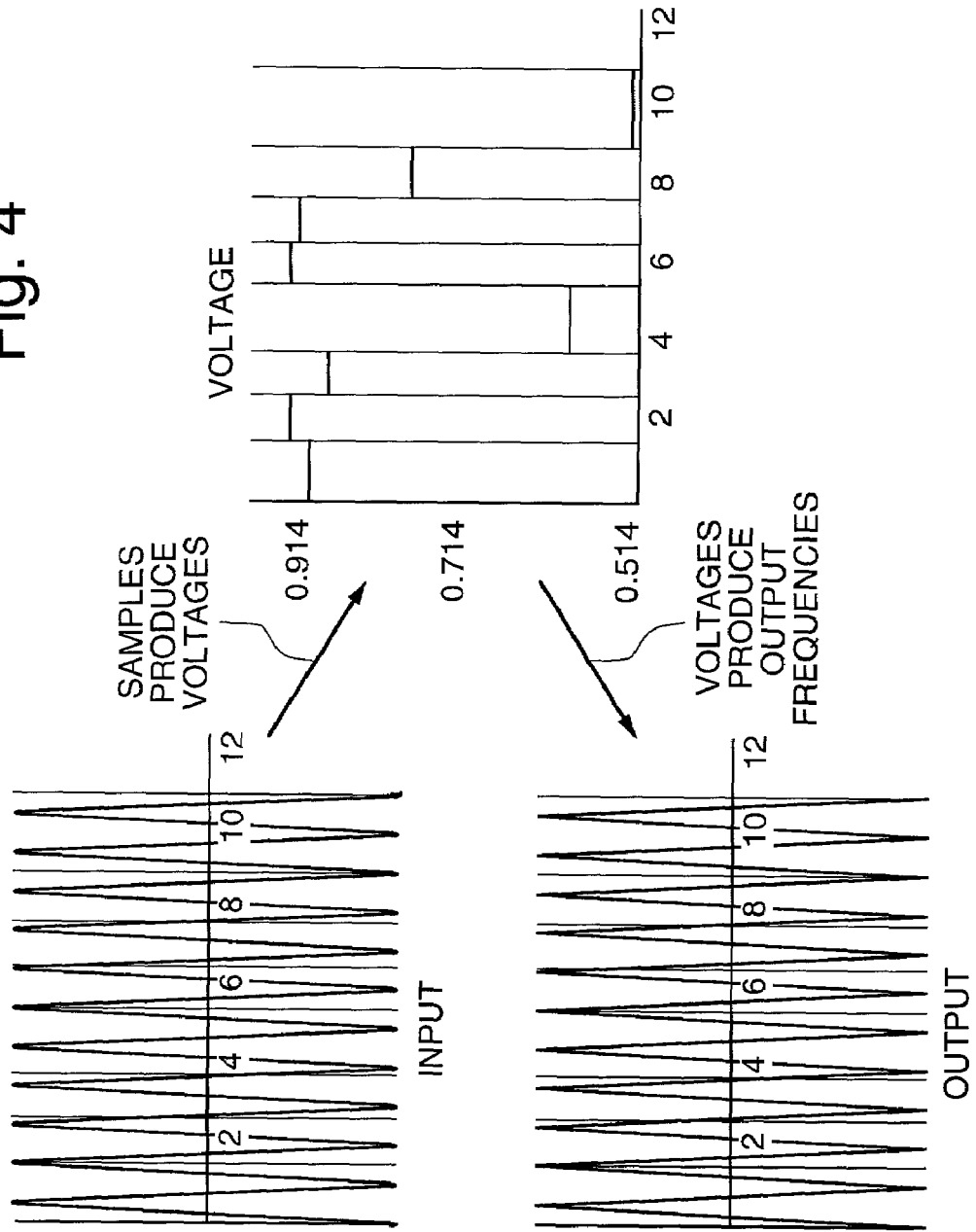
FIG. 4 illustrates that the input and output of the key generator are defined by the sampled value.

FIG. 4 illustrates that the input and output of the key stream generator 21 are defined by the sampled value. FIG. 4 illustrates several periods of operation. Each period results in a voltage (shown on the right side of FIG. 4) and an output frequency (shown on the bottom of FIG. 4). The loop gain parameter, b, controls the frequency resulting from the sampled value.

Figure 5:
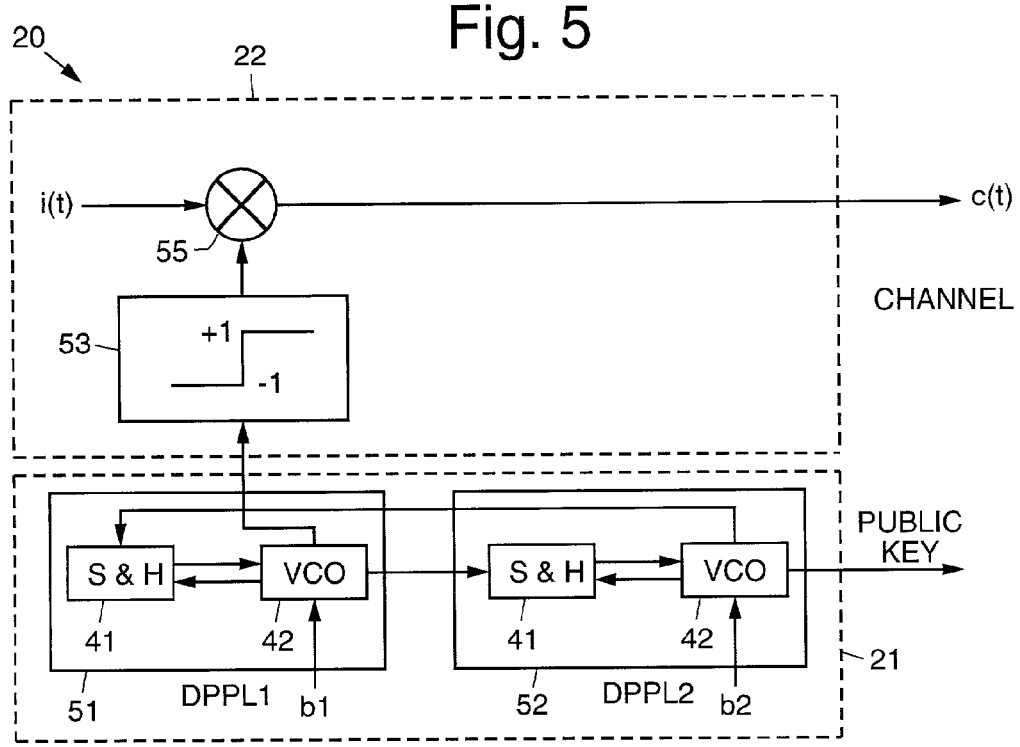
FIG. 5 illustrates details of the transmitter of the system shown in FIG. 1, which uses coupled digital phase lock loops.

FIG. 5 illustrates details of the transmitter 20 of the system 10 shown in FIG. 1, which uses first and second coupled digital phase lock loops (DPLL1, DPLL2) 51, 52. The transmitter 20 thus includes a pair of coupled chaotic circuits comprising the two digital phase lock loops 51, 52. The first digital phase lock loop 51 comprises a sample and hold circuit 41 coupled to a voltage controlled oscillator 42 in the manner discussed with reference to FIG. 3. The second digital phase lock loop 52 also comprises a sample and hold circuit (41 coupled to a voltage controlled oscillator 42.

The VCO 42 in the first digital phase lock loop 51 receives a first loop gain signal b1 while the VCO 42 in the second digital phase lock loop 52 receives a second loop gain signal b2. The output of the VCO 42 in the first digital phase lock loop 51 is input to the sample and hold circuit 41 of the second digital phase lock loop 52. The output of the VCO 42 in the second digital phase lock loop 52 is input to the sample and hold circuit 41 of the first digital phase lock loop 51. The VCO 42 samples the signal in the associated sample and hold circuit 41 and generates an output frequency in response thereto.

The output of the VCO 42 in the first digital phase lock loop 51 is converted to +1 or −1 by a hard limiting circuit 53, and is input to an analog multiplier circuit 54. The product of the information signal, i(t) and the sampled random signal output by the hard limiting circuit 53 is the cipherwave c(t). The multiplication performed by the analog multiplier circuit 54 spreads the information signal spectrum. For example, the information signal bandwidth could be 500 MHz, and the frequency "fo" could be at 375 MHz. This yields a spreading factor of less than 1.7 between the information signal and the cipherwave c(t).

The purpose of the coupled chaotic circuits (the first and second coupled digital phase lock loops 51, 52) is to allow synchronization with a third chaotic circuit 61 located in the receiver 30. The purpose of the hard limiting circuit 53 is to insure that the multiplier product does not attenuate any information signal components.

Figure 6:
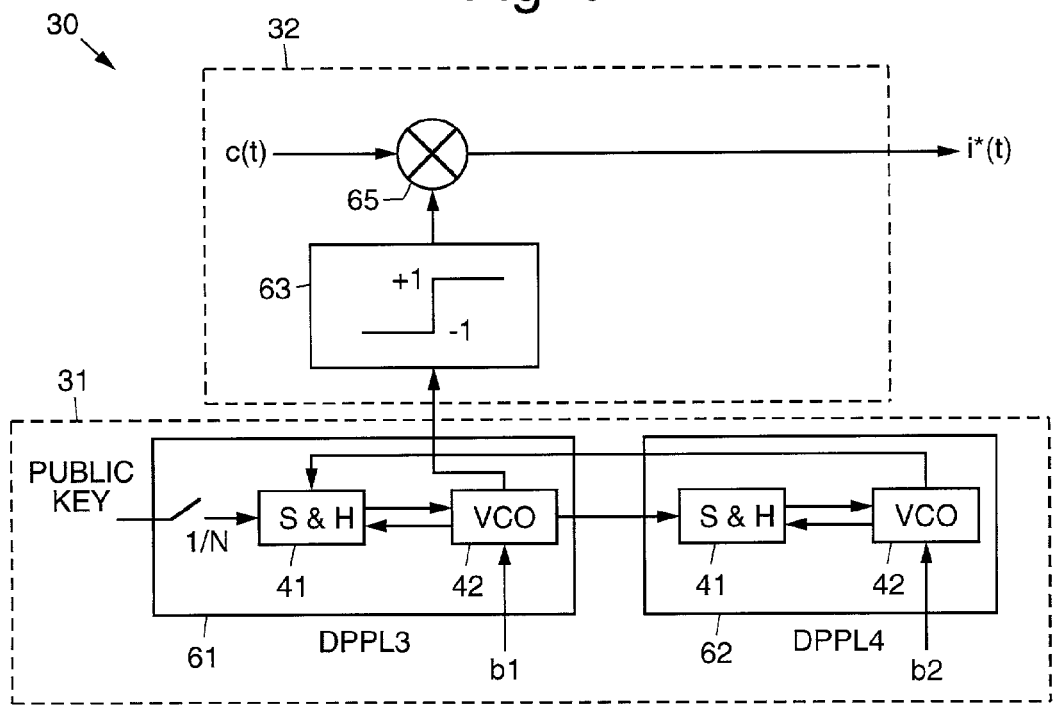
FIG. 6 illustrates details of the receiver of the system shown in FIG. 1, which contains a copy of the digital phase lock loop used in the transmitter, and reproduces the key stream.

FIG. 6 illustrates details of the receiver 30 of the system 10 shown in FIG. 1, which contains the third chaotic circuit 61 which is a copy of the first digital phase lock loop 51 used in the transmitter 20, and reproduces the key stream. The receiver 30 is similar to the transmitter 20. The receiver 30 comprises a pair of coupled chaotic circuits comprising the third and fourth digital phase lock loops (DPLL3, DPLL4) 61, 62.

The third digital phase lock loop 61 comprises a sample and hold circuit 41 coupled to a voltage controlled oscillator 42. The fourth digital phase lock loop 62 also comprises a sample and hold circuit 41 coupled to a voltage controlled oscillator 42.

The VCO 42 in the third digital phase lock loop 61 receives the first loop gain signal b1 while the VCO 42 in the fourth digital phase lock loop 62 receives the second loop gain signal b2. The output of the VCO 42 in the third digital phase lock loop 61 is input to the sample and hold circuit 41 of the fourth digital phase lock loop 62. The output of the VCO 42 in the fourth digital phase lock loop 62 is input to the sample and hold circuit 41 of the third digital phase lock loop 61. The VCO 42 samples the signal in the associated sample and hold circuit 41 and generates an output frequency in response thereto.

An input switch 66 is provided at the public key input to the third digital phase lock loop 61. The output of the VCO 42 in the third digital phase lock loop 61 is converted to +1 or −1 by a hard limiting circuit 63, is input to the analog multiplier circuit 65.

The information signal i*(t) is reconstructed from the cipherwave, c(t) by multiplying by a repeatable random number in the analog multiplier circuit 65. Since the product of −1*−1 and 1*1 both equal 1, the randomness is removed.

The third digital phase lock loop 61 synchronizes to the chaotic circuits 51, 52 in the transmitter 20 because it is a copy of the first digital phase lock loop 51 with the same input signals. The purpose of the input switch 66 and the fourth digital phase lock loop 62 is to reduce the data rate needed for the public channel. The purpose of the fourth digital phase lock loop 62 is to copy the actions of the second digital phase lock loop 52.

When the input switch 66 is closed, then the third digital phase lock loop 61 receives the same input as the first digital phase lock loop 51. When the input switch 66 is open, then the third digital phase lock loop 61 receives a similar input using the fourth digital phase lock loop 62.

The number of samples that may be discarded is a function of the degree of synchronization at the key parameter values. If a digital channel is used for the public key, an A/D and D/A converter would be used with the sampling frequency, fo.

There are an infinite number of possible key parameters that provide chaos and that provide synchronization. A plot of normalized phase angle versus key parameter, b, reveals this. Any value of the key parameter, b, between 140 and 200 provides for a chaotic signal output.

Referring now to FIG. 7, it is a flow diagram illustrating an exemplary chaos privacy method 70 in accordance with the principles of the present invention. The exemplary chaos privacy method 70 comprises the following steps.

A random key stream k(t) is generated 71 using a chaotic circuit. Analog information signals i(t) and the random key stream k(t) are processed 72 to generate a cipherwave c(t) that has a uniform probability density for all information signals i(t), and random key streams k(t). The cipherwave c(t) and a public key k(t) are transmitted 73 over a communication channel. The cipherwave c(t) and public key k(t) are received 74. A chaotic circuit is used to synchronize 75 to the public key k(t) to produce a copy of the random key stream k*(t). The cipherwave c(t) and the copy of the random key stream k*(t) are processed 76 to reconstruct the information signal i*(t).

Thus chaotic privacy systems and methods have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A chaos privacy system for use in communicating an analog signal, the system comprising:
    a transmitter comprising:
    a key stream generator comprising a chaotic circuit that generates a key stream in response toa private key parameter, and transmits a key synchronization parameter; and
    a transmitting chaotic circuit that processes the analog information signal and the key stream to generate and transmit a cipherwave; and
    a receiver, for receiving the transmitted cipherwave, the transmitted key synchronization parameter, and a copy of the private key parameter, that comprises:
    a key stream generator comprising a chaotic circuit that processes the copy of the private key parameter and the transmitted key synchronization parameter to generate a copy of the key stream; and
    a receiving chaotic circuit that processes the copy of the key stream and the cipherwave to demodulate the cipherwave to recover and output the information signal.

2. The system recited in claim 1 wherein the key stream generator in the transmitter comprises:
    a first chaotic circuit comprising a first sample and hold circuit coupled to a first voltage controlled oscillator; and
    a second chaotic circuit comprising a second sample and hold circuit coupled to a second voltage controlled oscillator;
    wherein an output of the first voltage controlled oscillator provides an input to the second sample and hold circuit, a first output of the second voltage controlled oscillator provides an input to the first sample and hold circuit, the first voltage controlled oscillator outputs the key stream, and a second output of the second voltage controlled oscillator outputs the key synchronization parameter.

3. The system recited in claim 2 wherein the transmitting chaotic circuit comprises:
    a hard limiting circuit for receiving the key stream from the key stream generator and for converting the output of the first voltage controlled oscillator to selected fixed values; and
    an analog multiplier circuit for multiplying the information signal with the sampled random signal to produce the cipherwave.

4. The system recited in claim 1 wherein the key stream generator in the receiver comprises:
    a third chaotic circuit comprising a third sample and hold circuit coupled to a third voltage controlled oscillator; and
    a fourth chaotic circuit comprising a fourth sample and hold circuit coupled to a fourth voltage controlled oscillator;
    wherein the key synchronization parameter is input to the third sample and hold circuit, an output of the third voltage controlled oscillator provides an input to the fourth sample and hold circuit, an output of the fourth voltage controlled oscillator provides an input to the third sample and hold circuit, and the fourth voltage controlled oscillator outputs the copy of the key stream.

5. The system recited in claim 4 wherein the receiving chaotic circuit comprises:
a hard limiting circuit for receiving the copy of the key stream from the third voltage controlled oscillator and for converting it to selected fixed values;
a sample and hold circuit for sampling the hard limited output of the hard limiting circuit at a fixed frequency to produce a sampled random signal; and
an analog multiplier circuit for multiplying the cipherwave with the sampled random signal to recover the information signal.

6. A chaos privacy method for use in communicating an analog information signal, the method comprising the steps of:
generating a random key stream using a chaotic circuit;
processing analog information signals and the random key stream to generate a cipherwave that has a uniform probability density for all information signals, and random key streams;
transmitting the cipherwave and a public key over a communication channel;
receiving the cipherwave, and public key;
synchronizing to the public key using a chaotic circuit to produce a copy of the random key stream; and
processing the cipherwave and the copy of the random key stream to reconstruct the analog information signal.

7. The method recited in claim 6 wherein the cipherwave is generated by multiplying the information signals by the random key stream.

8. The method recited in claim 6 wherein the information signal is generated by multiplying the cipherwave by the random key stream.

* * * * *